United States Patent [19]

Schuur

[11] 3,805,254

[45] Apr. 16, 1974

[54] DEVICE FOR WRITING SUBWORDS INTO A STORE IN AN INVERTED OR NON-INVERTED FORM

[75] Inventor: Cornelis Christianus Maria Schuur, Emmasingel, Netherlands

[73] Assignee: U.S. Philips Corporation, New York, N.Y.

[22] Filed: Aug. 30, 1972

[21] Appl. No.: 285,018

[30] Foreign Application Priority Data

Sept. 4, 1971 Netherlands ....................... 7112207

[52] U.S. Cl....... 340/172.5, 340/173 R, 340/174 TB

[51] Int. Cl.............................................. G11c 7/00

[58] Field of Search ... 340/172.5, 146.1 BA, 173 R, 340/174 M, 174 MA, 174 TB

[56] References Cited

UNITED STATES PATENTS 3,681,764 8/1972 Conant ........................ 340/172.5 X 3,401,375 9/1968 Bell ................................ 340/172.5

*Primary Examiner*—Paul J. Henon

*Assistant Examiner*—James D. Thomas

*Attorney, Agent, or Firm*—Frank R. Trifari

[57] ABSTRACT

Apparatus for writing subwords into a store. A word to be written into a matrix store is divided into subwords. If the number of zeros in the word deviates too much from 50 percent, the subwords can be inverted until the difference is sufficiently small. The process is less time-consuming as groups of subwords are treated simultaneously. As a result, the impedance of the word lines varies little during writing and the interference between the bits of the word is also reduced.

7 Claims, 11 Drawing Figures

Figure 1:
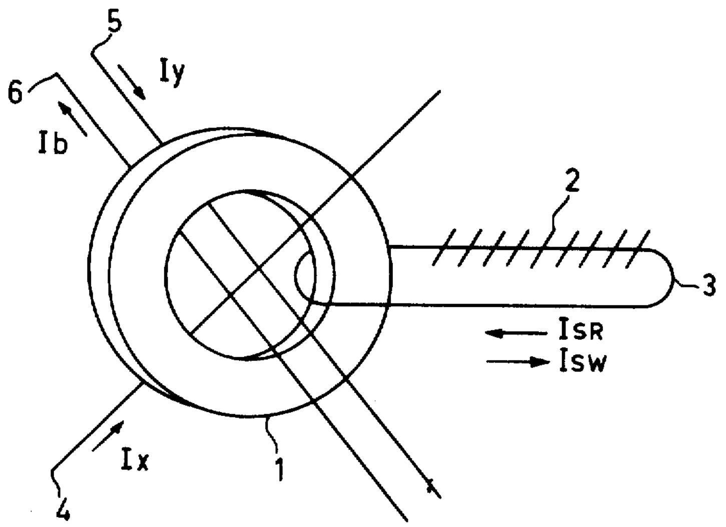

| S1 | S2 | T |
|---|---|---|
| 0 * | 0 | 4 |
| 0 | 1 * | 3 |
| 0 | 2 | 2 |
| 0 | 3 | 3 |
| 0 | 4 | 4 |
| 1 * | 0 | 3 |
| 1 | 1 | 2 |
| 1 | 2 | 3 |
| 1 | 3 | 4 |
| 1 * | 4 * | 3 |
| 2 | 0 | 2 |
| 2 | 1 | 3 |
| 2 | 2 | 4 |
| 2 | 3 * | 3 |
| 2 | 4 * | 2 |
| 3 | 0 | 3 |
| 3 | 1 | 4 |
| 3 * | 2 | 3 |
| 3 | 3 * | 4 |
| 3 | 4 * | 3 |
| 4 | 0 | 4 |
| 4 * | 1 * | 3 |
| 4 * | 2 | 2 |
| 4 * | 3 | 3 |
| 4 * | 4 | 4 |

| S1 | S2 | S3 | S4 | T |
|---|---|---|---|---|
| 0 * | 0 * | 0 | 0 | 4 |
| 0 * | 0 | 0 | 1 | 3 |
| 0 * | 0 | 0 | 2 | 4 |
| 0 * | 0 | 1 | 1 | 4 |
| 0 | 0 | 1 | 2 | 3 |
| 0 | 0 | 2 | 2 | 4 |
| 0 | 1 | 1 | 1 | 3 |
| 0 | 1 | 1 | 2 | 4 |
| 0 | 1 | 2 * | 2 | 3 |
| 0 | 2 | 2 * | 2 | 4 |
| 1 | 1 | 1 | 1 | 4 |
| 1 | 1 | 1 | 2 * | 3 |
| 1 | 1 | 2 * | 2 | 4 |
| 1 | 2 * | 2 * | 2 | 3 |
| 2 * | 2 * | 2 | 2 | 4 |

| S1 | S2 | S3 | S4 | T |
|---|---|---|---|---|
| 0 * | 0 * | 0 | 0 | 8 |
| 0 * | 0 | 0 | 1 * | 7 |
| 0 * | 0 | 0 | 2 | 7 |
| 0 * | 0 | 0 | 3 | 8 |
| 0 * | 0 | 1 * | 1 | 8 |
| 0 * | 0 | 1 | 2 | 8 |
| 0 * | 0 | 1 * | 3 * | 7 |
| 0 * | 0 | 2 | 2 * | 8 |
| 0 * | 0 | 2 | 3 * | 7 |
| 0 * | 0 | 3 | 3 * | 8 |
| 0 | 1 * | 0 | 0 * | 7 |
| 0 | 1 * | 0 * | 1 | 8 |
| 0 | 1 * | 0 * | 2 * | 8 |
| 0 | 1 * | 0 | 3 | 7 |
| 0 | 1 * | 1 * | 1 * | 8 |
| 0 | 1 * | 1 | 2 | 7 |
| 0 | 1 * | 1 | 3 | 8 |
| 0 | 1 * | 2 | 2 | 8 |
| 0 | 1 * | 2 * | 3 | 8 |
| 0 | 1 * | 3 * | 3 | 7 |
| 0 * | 2 | 0 | 0 | 7 |
| 0 * | 2 | 0 | 1 | 8 |
| 0 | 2 | 0 * | 2 | 7 |
| 0 | 2 | 0 * | 3 | 8 |
| 0 | 2 * | 1 * | 1 * | 7 |
| 0 | 2 * | 1 * | 2 | 7 |
| 0 | 2 * | 1 | 3 | 7 |
| 0 | 2 * | 2 | 2 | 7 |
| 0 | 2 | 2 | 3 | 7 |
| 0 | 2 | 3 | 3 | 8 |

DEVICE FOR WRITING SUBWORDS INTO A STORE IN AN INVERTED OR NON-INVERTED FORM

The invention relates to a device and method of writing words, consisting of a number of bits which can either be one or zero, into a matrix store in which steps are taken so as to reduce the spread in the percentage of zeros. A method of this kind is known from published Netherlands Pat. Application No. 6913759, wherein Prior to writing in, it is investigated for each word whether the percentage of zero-valued bits exceeds 50. If this is the case, the word is written in, in an inverted form, so that the percentage of zeros varies between 0 and 50, and hence the percentage of ones varies between 50 and 100. The object of this method is to minimize the number of zeros in a word, because the write energy required for a zero is larger than the write energy required for a one. The definition of zeros and ones, however, can be interchanged at random. Summarizing, a method of this kind reduces the maximum required write energy to one half: the most unfavorable case occurs if the word to be written in comprises as many zeros as ones. The generator for the write energy, consequently, has to be proportioned to deal with this case. A known method of driving a line of a matrix store is to make use of a switch core. A circuit arrangement of this kind is described in the book by P.A. Neeteson, Square-loop Ferrite Core Switching, Philips Technical Library, Eindhoven 1964. According to FIG. 29 on page 46 of said book, a primary core has a first winding which is connected to a generator. A second winding is provided which is connected in series with windings through a number of load cores. On page 59 of the book, a case is described involving a store having magnetic cores, selection being performed according to the coincidence principle. If the magnetization state of a core changes, it constitutes a substantially resistive load, while if the magnetization state does not change, it constitutes a mainly inductive load.

Figure 2:
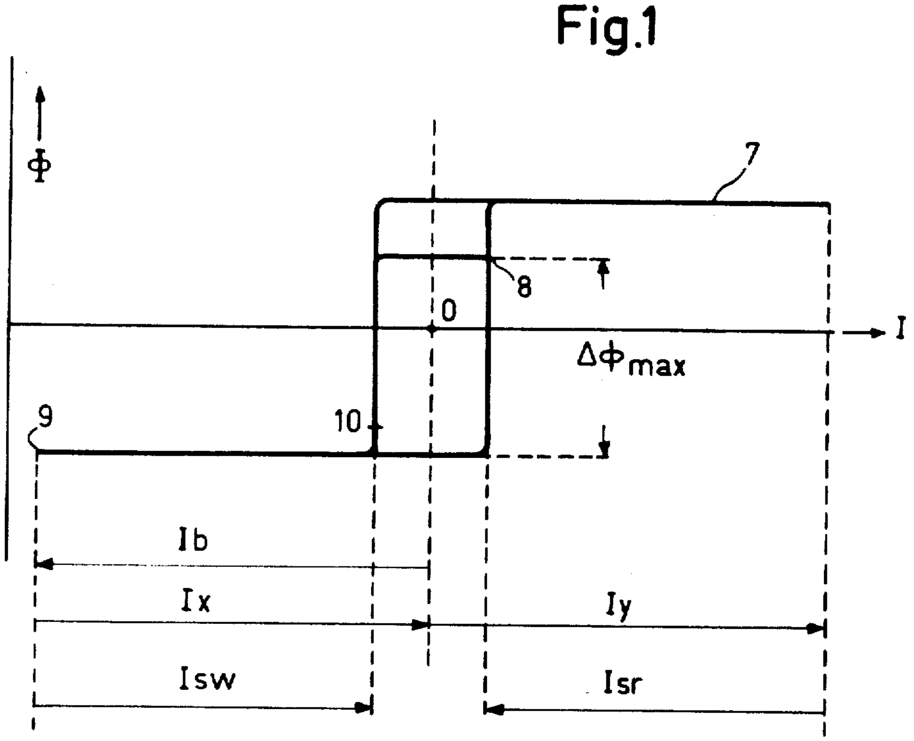

In this respect, reference is already made to the figures. FIGS. 1 and 2 which show a switch core in a matrix store and a graph of the magnetization and the currents required therefor, respectively. The FIGS. 3 to 11 are a further illustration of the invention.

FIG. 1 shows a switch core 1 of a load wire 3 on which a number of magnet cores 2 are threaded. Also threaded through the switch core are two selection wires 4 and 5, and the bias wire 6 through which the selection currents Ix and Iy, and the bias current Ib can flow in the indicated directions.

FIG. 2 shows the magnetization in the switch core as a function of the horizontally plotted currents I. Also shown is the hysteresis loop of the switch core 7. The bias current Ib is always present so that the rest state is denoted by point 9. It is assumed that the store is read out in a destructive manner, so that the cores assume the state which is defined as 0. The switch core 1, and hence the switch cores 2, are selected by the simultaneous appearance of the currents Ix and Iy, the absolute value of each of which corresponds to Ib. As a result of the selection, the secondary read current Isr is induced, and the cores 2 are each, out. The flux in the switch core 1 should not become so high that it is saturated, as it then stops to act as a transformer (the extreme point is, for example, point 8). Consequently, the dimensions of the switch core are to be chosen to be sufficiently large or, as is described in the said book "Square-loop ferrite core switching" (page 52), a number of small cores are to be used together as one switch core. The point 8 is reached if exclusively ones are read out. This is because the counter voltage across the secondary winding is then maximum. In the subsequent write phase Ix and Iy are terminated, so that the secondary write current Isw is induced in the wire 3. So as to keep the read phase brief, the flux built up during reading must be quickly broken down. This is the case if the secondary counter voltage is also high during the write phase. On the other hand, the minimum flux variation during reading must be at least as large as the maximum required flux variation during writing, i.e., the variation which is required for writing back ones exclusively.

The minimum cycle time is obtained if the secondary counter-voltage during the read phase equals that during the write phase. In order to reduce this time, the method according to the invention is characterized in that at least one subword is formed from the bits, said at least one subword and the remainder of the word being examined as regards the percentage of zeros contained therein. At least one of them is written in in an inverted form, if as a result the percentage of zeros in the word shows at the most a given difference with respect to 50 percent. In this way, a smaller spread in the number of zeros is produced so that, for example, the termination of line 3 can be optimized so that the time for one read/write cycle is limited. This optimization of the termination can be effected by means of a special component, for example, a resistor, but also by modifying the line, for example, by a different choice of the conductivity thereof.

The percentage of zeros can be examined implicitly and explicitly. The former occurs, for example, in the case of one subword: the percentage of zeros in the remainder of the subword can then be determined from the percentage of zeros of said subword and the percentage of zeros of the complete word. On the other hand, in the case of a plurality of subwords, it is not always necessary to determine the percentages of zeros of all subwords.

An additional advantage of the method according to the invention, which can occur in a store as set forth, but also in a store having another structure, for example, without a switch core, is the following: In the case of writing into a matrix store according to a coincidence principle interaction occurs between the bit lines, which is caused mainly by capacitive coupling: the potential of the portion of the bit line containing the bit to be written in influences the other bit lines. It may be that a "zero" causes a bit current, and that a "one" does not cause a bit current. If the spread in the number of ones is only slight, always approximately the same error will arise. On the other hand, if a "zero" produces a positive bit current and a "one" produces a negative bit current, the errors will substantially eliminate each other if there are as many zeros as there are ones.

A preferred embodiment according to the invention is characterized in that the word is subdivided into a number of subwords. The percentage of zeros in the word Is compared with a standard percentage. The subwords are inverted or not, in the case of too large a difference between the percentage and the standard percentage, after an examination as regards the percentages of zeros contained therein, until the said difference has become sufficiently small. In this way, a systematic set-up is produced and the treatment is stopped when the standard percentage has been sufficiently closely approximated.

A further preferred embodiment according to the invention is characterized in that a number of groups of subwords is formed from the subwords, the examination as regards the percentages of zeros in, and the possible inversion of the subwords of a group, being effected simultaneously. As the subwords of a group are treated simultaneously, time can be saved.

A further preferred embodiment according to the invention is characterized in that the sign of the said difference is also determined. As a consequence thereof, if after the examination of the percentages of zeros and the possible inversion of the subwords of a group said sign has changed, the subsequent group comprises at least mainly subwords which formed part of the preceding group. If said sign has remained unchanged, the subsequent group comprises at least mainly subwords which did not form part of the preceding group. It may be that the treatment of a group of subwords produces an "overshoot." This is to be partly cancelled. If the step taken had insufficient effect, additional subwords have to be considered. In this way, the standad percentage is systematically approximated.

A further preferred embodiment according to the invention is characterized in that the subwords contain substantially the same number of bits, a subsequent group of subwords comprising at the most as many subwords as a preceding group. An iteration is thus readily realized. Generally, the effect of a subsequent group will be less than the effect of a preceding group. Moreover, the absolute value of the deviation after the treatment of a group will generally be smaller than before the treatment, so that the extent of the steps yet to be taken can also be smaller.

The invention also relates to a store consisting of elements which can have two stable states, called zero and one. First means are provided which can be energized for writing in an amount of information which together constitutes a word. Second means are provided by which, in the case of simultaneous energizing with said first means, zeros can be written in, but by which, in the case of simultaneously changed energizing, ones can be written in. Third means are provided by which said second means can be controlled in order to reduce the spread in the percentage of zeros in the word to be written. A zero determining unit is provided by which the percentages of zeros in at least one subword, forming part of the word, and in the remainder of the word can be determined. The signals of the determining unit can be applied to a deciding unit by which said third means can be energized with respect to the at least one subword and the remainder of the word treated by the zero determining unit. The operation of the zero determining unit can be, for example, analog and its construction can be simple, while also the deciding unit can have a simple structure. For example, it can comprise two threshold value detectors whose outputs are connected by simple AND-circuits.

A preferred embodiment of a device according to the invention is characterized in that the percentages of zeros in the subwords into which the word is divided and in the complete word can be determined by the zero-determining unit. It is possible to determine the difference between the percentage of ones in the word and a standard percentage by means of a difference detector. It is possible to generate a proceed signal in the case of too large a difference, by which the zero-determining unit can be activated at least as regards a subsequent subword. It is possible, in the case of a subword which is to be written-in in an inverted form, to supply the information of that subword to the zero-determining unit in an inverted form. It is possible to generate a stop signal by means of the difference detector in the case of a sufficiently small difference. If the zero-determining unit has an analog construction, the construction of the difference detector may also be simply analog. The subword to be inverted can already be inverted prior to writing-in. On the other hand, the information thereof can be applied to the one-determining unit only in an inverted form, while the subword itself remains unchanged for the time being.

A preferred embodiment of a device according to the invention is characterized in that the zero-determining unit comprises a plurality of inputs so that the percentages of zeros of a plurality of subwords can be separately determined simultaneously. This device increases the processing speed of the zero-determining unit.

Figure 3:
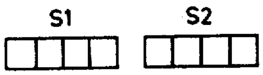
Figure 4:
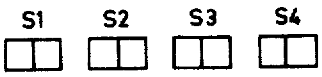
Figure 5:
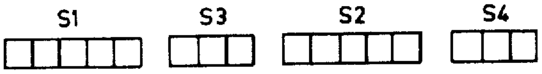
Figure 6:
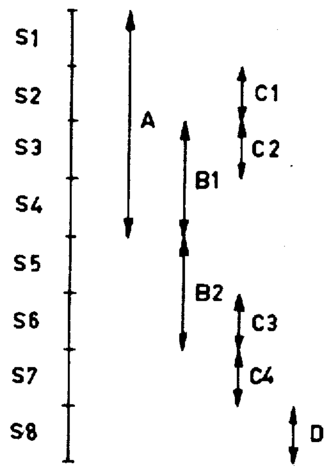
Figure 7:
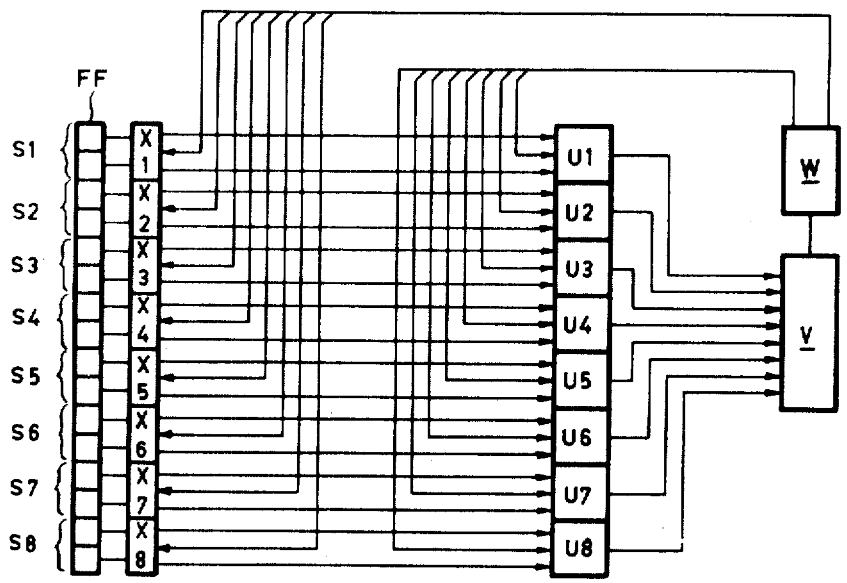
Figure 8:
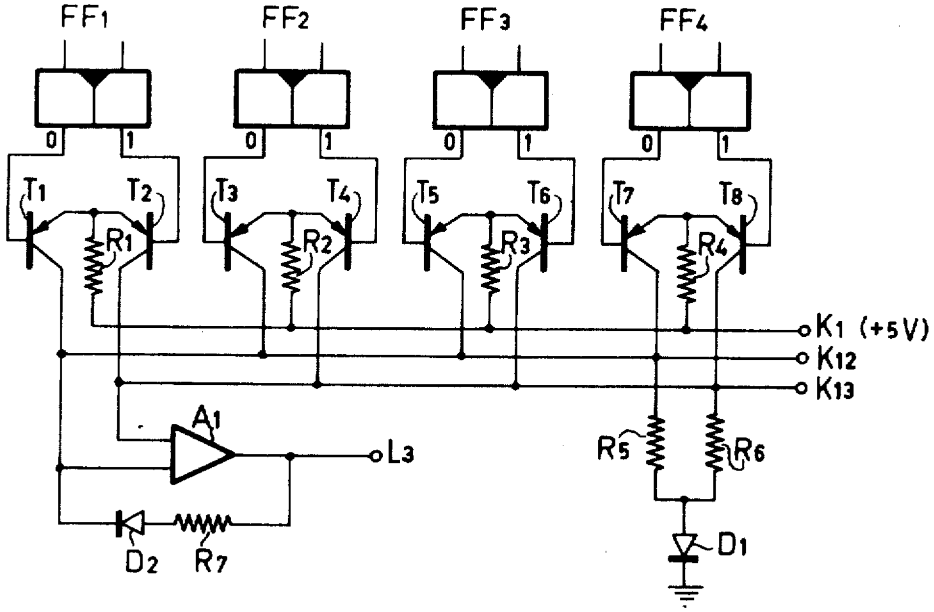
Figure 9:
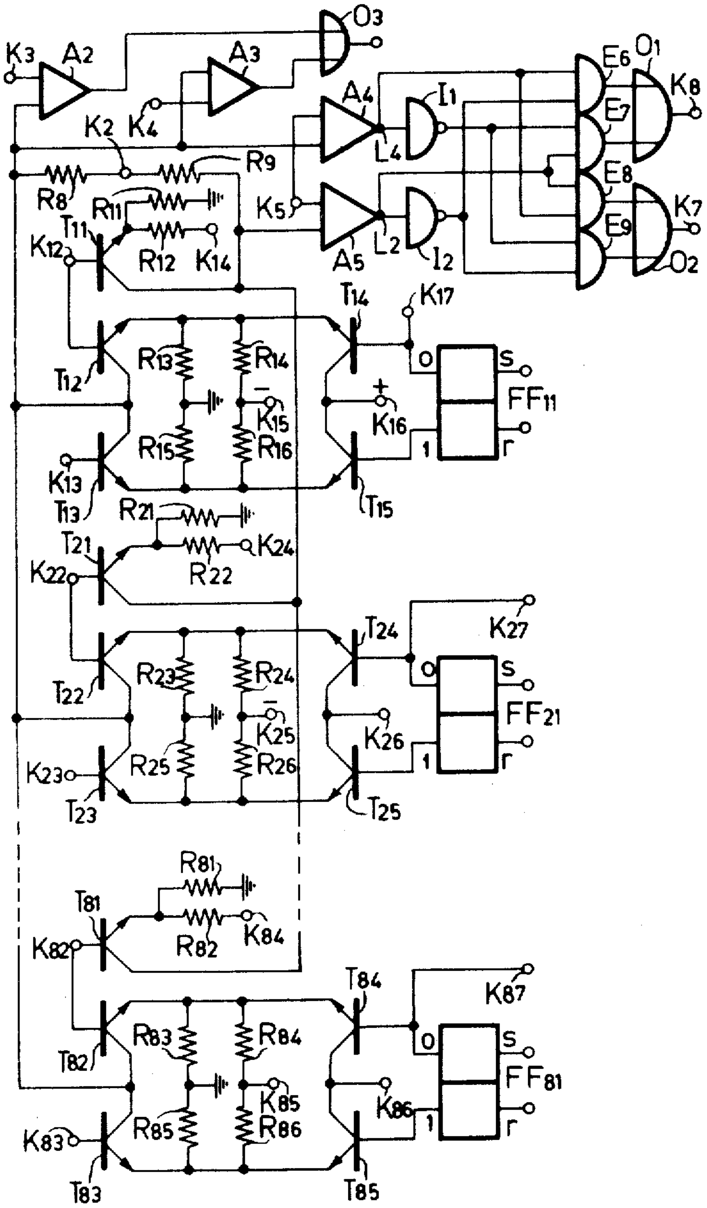
Figures 10, 11:
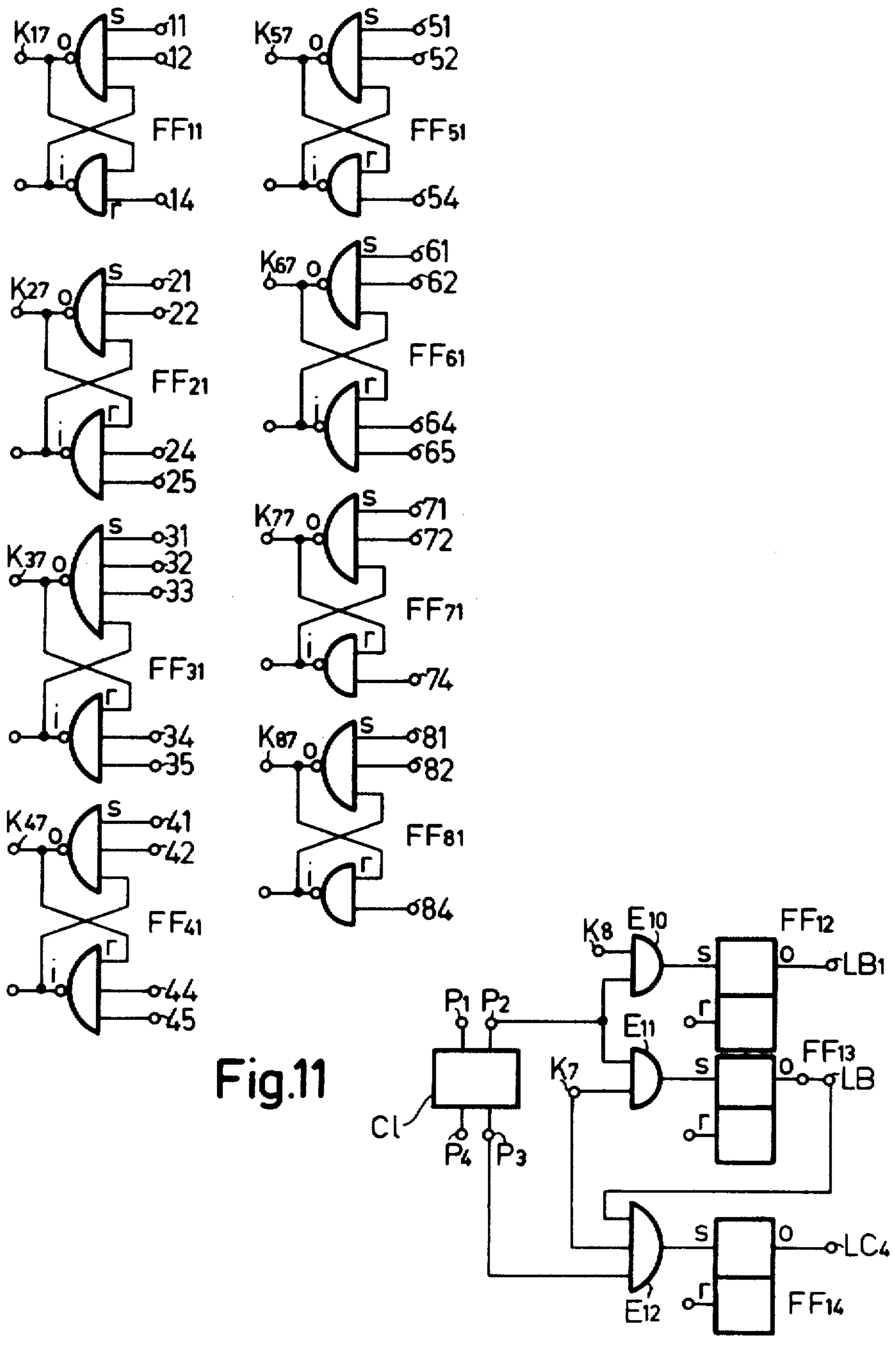

The invention will be described in detail with reference to the drawing in which; FIG. 1 schematically shows a switch core in a matrix store and FIG. 2 is a graph showing the magnetization state and the currents required therefor of the core of FIG. 1. FIGS. 1 and 2 have already been described. The FIGS. 3, 4 and 5 show three examples of words from which subwords have been formed. FIG. 6 shows a processing diagram of the groups of subwords which have been formed from a word. FIG. 7 shows a diagram of a device according to the invention. FIG. 8 shows an example of a zero-determining unit. FIG. 9 is a detailed view of a portion of FIG. 7. FIG. 10 shows a portion of a deciding unit. FIG. 11 shows eight bookkeeping flipflops.

Now referring to FIG. 3 a word of eight bits is shown, consisting of two subwords of four bits each. The columns S1 and S2 state all possibilities for the number of ones in the subwords. An asterisk denotes that a subword is written-in in an inverted form, and the column T states the number of ones ultimately wirtten-in, this number varying between 2 and 4.

FIG. 4 shows an example of a word comprising eight bits which is divided into four subwords of two bits each. For each subword three cases are possible (0, 1 and 2 ones), but the cases which change over into the cases shown in the table by exchanging the subwords have been omitted. The number of ones to be ultimately written-in varies between 3 and 4. The more subwords, the smaller the spread can be. The optimum spread feasible amounts to half the number of bits of a subword. If a word consists of eight subwords of 32 bits (i.e. 256 bits in total), the number of ones can vary between 128 and 128−16=112. Another possibility is a variation between 128 and 128+16 = 144 ones.

The most unfavourable case occurs, if all subwords contain as many ones as zeros, but one subwords contains only ones or only zeros. If the subwords are of different length, the most unfavorable case is the case where the longest subword contains only ones or only zeros. A small advantage is obtained, if the subwords consist of an odd number of bits: the number of zeros and the number of ones always differ by at least one in that case.

FIG. 5 shows another example of a word consisting of four subwords of 5,5,3 and 3 bits. The number of ones in the word (column T) varies between 7 and 8. Only the case in which the first subword contains zero ones is elaborated. The given solutions are often not the only ones. For example, in the last line of FIG. 5 an acceptable result (T=7) can also be achieved by writing in S1, S3 and S4 in an inverted form.

The word can be divided into a plurality of subwords. The improvement obtained by dividing the word into subwords which each time show a length difference of two bits according to FIG. 5, constitutes a reduction of the spread by one, in the case of four subwords, and by two, in the case of six subwords, etc.

FIG. 6 shows a diagram of how a word consisting of eight subwords can be treated. The subwords are denoted by S1 . . . . 8. First the percentage of zeros in the word is determined. If this percentage lies between given limits, for example, between 44 percent and 56 percent, nothing further will be done. It is to be noted, that in this case which involves subwords having the same even number of bits, the optimum result is a percentage of ones between 44 and 50 percent. If the percentage of ones is less than 44 percent, the group A of four subwords is treated. All subwords thereof containing less than 50 percent ones are destined to be written-in in an invented form, which is remembered by a bookkeeping bit for the relevant subword. As a result, this subword will be considered as having been inverted for the determination of the percentage of ones. Three cases are then possible:

a. the percentage of ones of the word lies between 44 and 56 percent after the change: in that case nothing further is done, and the word is ready to be written-in.
b. the percentage of ones of the word still lies below 44 percent: in that case a next group consisting of two subwords is treated (B2).
c. the percentage of ones now lies above 56 percent: in that case the change has been too extensive, and a next group B1, consisting of two subwords, is dealt with.

In this last case the group B1 forms part of the group A, but it could also comprise another word, for example, S5.

After the B-group has been treated, the process is continued as described after the A-group. Assume that B2 was treated. If the above-mentioned case a) was satisfied, the process is halted. In the case b), a group C4 consisting of one subword will be treated. In case c), the group C3 consisting of one subword will be treated. Finally, after C4 the group D, also consisting of one subword, may be treated.

This can also be schematically represented as follows: Assume the number of ones in the word to be N1, the number of zeros in the word to be N0, the number of ones in the subword $j (j = 1 \ldots 8)$ to be $N1j$, and the number of zeros to be $Noj$. Furthermore, the following logical values are defined.

$L2 = 1$ if $N1/N0 > 1$ for the information of the whole word as it is offered. $L4 = 1$ if $N1'/N0' > 1$ for the information of the whole word, the subwords which would have to be written-in in an inverted form also being considered as such (the decision "inverted writing-in" can also be overruled as appears from the foregoing). $L1 = 0$ if $11/14 < N1'/N0' < 14/11$ for the information of the word, where the subwords have possibly been considered as having been inverted ($11/25 = 44$ percent, $14/25 = 56\%$ !). $L3j = 1$ if $N1i/N0j$ 1 for the information of the subword as it is originally applied.

The information of a subword $j$ is destined to be written-in in an inverted form, if $L1 \cdot (L2 \cdot L3j + \overline{L2} \cdot \overline{L3j}) = 1$. This means that the percentage of zeros differs too much from 50 percent ($L1=1$) and, moreover, that the deviations of the relevant subword and of the entire word are in the same direction.

In the first phase of the treatment, this is done for the subwords of group A of FIG. 4, so $j = 1 \ldots 4$. A "+" sign means an OR-function, a "·" sign means an AND-function.

If $L1=0$ after this step, the object has been achieved. However, if $L1, (\overline{L2} \cdot L4 + L2 \cdot \overline{L4}) = 1$, an overshoot exists and the group B1 is treated. A line above a logical value means that the inverted value thereof is taken into account. If $L1 \cdot (L2 \cdot L4 + \overline{L2} \cdot \overline{L4}) = 1$, the change, if any, in the word to be written-in has been too slight, and the group B2 must be treated.

After that, of the group of subwords to be subsequently treated, those subwords are inverted for which: $(L2 \cdot L3j + \overline{L2} \cdot \overline{L3j}) = 1$. It is to be noted that L2 denotes the situation which has arisen before the treatment of the relevant group. Any previous inversions of subwords are, therefore, taken into account.

If group B1 is treated, an information bit LB1 is stored; if group B2 is treated, an information bit LB2 is stored.

In phase 3 stopping takes place if $L1=0$. Otherwise, the following groups (consisting of one subword in this case) are treated:

$$C1 \text{ if } LB1 \cdot L1 \cdot (\overline{L2} \cdot L4 + L2 \cdot \overline{L4}) = 1$$

$$C2 \text{ if } LB1 \cdot L1 \cdot (L2hu\ .L4 + \overline{L2} \cdot \overline{L4}) = 1$$

$$C3 \text{ if } LB2 \cdot L1 \cdot (\overline{L2} \cdot L4 + L2 \cdot \overline{L4}) = 1$$

$$C4 \text{ if } LB2 \cdot L1 \cdot (L2 \cdot L4 + \overline{L2} \cdot \overline{L4}) = 1$$

In the latter case an information bit LC4 is stored. In phase 4 group D is treated if $LC4 \cdot L1 \cdot (L2 \cdot L4 + \overline{L2} \cdot \overline{L4} = 1)$. If a subword is destined to be stored in an inverted form, an information bit 1 is stored in a bookkeeping flipflop reserved for that subword.

FIG. 7 is a diagrammatic view of a device according to the invention, comprising a number of flip-flops FF in which the information of eight subwords S1 . . . 8 can be stored, eight inverters X1 . . . 8, eight zero-determining units V, and one deciding unit W. The inverters X1 . . . 8 apply the information of the subwords S1 . . . 8 to the zero-determining unit U1 . . . 8 in an inverted or non-inverted form. The latter units constitute the zero-determining device in conjunction with the zero-determining unit V. The inverters X1 . . . 8 are controlled by the deciding unit W. In the zero-determining unit V the information of the zero-determining units U1 . . . 8 is combined. Contained therein is a difference detector which compares the percentage of zeros in the word, consisting of the inverted or non-inverted subwords, with a standard percentage. If the difference is too large, the deciding unit W receives a proceed signal, and otherwise a stop signal. The deciding unit W decides which of the zero-determining units U1 . . . 8 must apply the percentage of zeros in a subword to the zero-determining unit V and which inverters must perform an inversion. When the stop signal arrives at W, the latter controls the storage of the word present in FF in a matrix store not shown. The subwords S1 . . . 8 are written-in in an inverted or non-inverted form in accordance with the state of the inverters X1 . . . 8.

FIG. 8 shows an example of a zero-determining unit U . . . or V according to FIG. 7. In this case, the subword contains four bits which are stored in the flipflops FF1 . . . 4. These are JK-flipflops, having a clockpulse input (denoted by a triangle), two data inputs, and two outputs which are denoted by 0 and 1, respectively. When a pulse is applied to the clock pulse input, the flipflop takes over the information on its inputs. One of the inputs, consequently, must be high and one must be low. In the first state of the flipflop, the 1-output is high, and in the second state, the 0-output is high. The zero-determining unit comprises eight transistors T1 . . . 8, seven resistors R1 . . . 7, two diodes D1, 2, one amplifier A1 and four connected terminals K1, 12, 13 and L3. The terminal K1 is connected to a positive potential, for example, 5 volts; the resistors R1 . . . 4 have a current-limiting action. If an output of the flipflop is 0, the associated transistor becomes conductive. In some cases, the output voltage of the flipflop can be applied to the base of the transistor via a voltage divider. The voltage divider has been omitted for the sake of simplicity. The conducting currents of the transistors are added across resistors R5, and R6, respectively, and the diode D1. R5 and R6 are identical and smaller than the resistors R1 . . . 4. The terminals K12, 13 carry voltages which are proportional to the number of ones (K12) and the number of zeros(K13), respectively, contained in the subword. The amplifier A1 is fed back via the resistor R7 and the diode D2, and a difference amplifier having a large negative amplification factor is provided. For example, if K12 has a potential which is only slightly higher than that of K13, the negative difference is amplified until a positive result is obtained which is added to the voltage present. As a result, A1 is driven to saturation. Consequently, a properly defined high voltage is present on L3, if the subword contains more ones than zeros: i.e. if $N1j/N0j > 1$. Consequently, the voltage on L3 supplies the already discussed information L3$j$. Similarly, a low voltage on this terminal means that $L3j = 0$. If the number of ones is equal to the number of zeros, the case is arbitrary, but the value of L3$j$ is always properly defined as being 1 or 0. The information of the number of ones and zeros in the subword is present in analog form on the terminals K12 and K13.

FIG. 9 is an elaboration of a portion of FIG. 7. The circuit for eight subwords comprises the transistors T11 . . . 15 for the first subword, T21 . . . 25 for the second subword etc., up to and including T81 . . . 85 for the eight subword. Also provided, are the resistors R11 . . . 16, R21 . . . 26, R81 – – – 86, the terminals K12 . . . 17, K22 . . . 27, . . . K82 . . . 87, the flipflops FF11, 21 . . . 81, and furthermore the amplifiers A2 . . . 5, the logic AND-gates E6 . . . 9, the logic OR-gates 01 . . . 3, the inverters L1, 2, the terminals K2, 3, 4, 5, 7, 8, L1. The terminals K12, 13 are the same as in FIG. 8. The same applies to K22, 23 for the second subword, and so on. The terminals K16, 26 . . . 86 are connected to a high voltage, for example, +5 Volts. The terminals K14, 24, . . . , 84, 15, 25 . . . 85 are connected to a low voltage, for example, –5 volts. The resistor pairs R11, 12, R13, 14, R15, 16 etc. form voltage dividers. Terminal K2 is connected to a high voltage, for example, +5 volts. The resistors R8 and R9 constitute current-limiting devices.

The transistors T11, 12, 13, 21, 22, . . . 83 operate as linear current amplifiers: the emitter-collector current of T11 is then substantially proportional to the number of ones in the first subword. The currents through T11,21 . . . 81 are added and the voltage across R9 is applied to an input of amplifier A5 which, similar to A1, is provided with a feedback (not shown). Present on terminal K5 is a reference voltage whose nominal value is equal to the voltage on the other input of A5 in the case of 50 percent ones in the complete word. If thre are less ones, the voltage is lower, so that the output of A5 (negative amplification factor) is low. If there are more ones, A5 supplies a high voltage. If the numbers are equal, the arbitrary situation exists again. Consequently, the information on the output corresponds to the said logic function L2.

Similarly, the transistors T12,22 . . . 82 constitute linear amplifiers, and the amplifier A4 also supplies a high signal in the case of more than 50 percent ones in the word, and vice vera. This holds good, if the transistors T14, T24 . . . 84 are cut off, i.e., if the base electrodes are low. This is the case, if the relevant flipflops have been reset, i.e., when the output terminal denoted by 1 is high.

The flipflops FF11 . . . 83 can be constructed as SR-flipflops. If a pulse arrives on the input terminal which is denoted by S, the flipflop is set: the output denoted by 0 then becomes high. A pulse on the $r$ input resets the flipflop so that the 1-output becomes high again. If FF11 has a low 1-output, T15 becomes conducting while T14 is cut off. T13 then operates as a linear amplifier, so that the information present on terminal K13 takes the place of the information present on terminal K12. As a result, the inverted information of the corresponding subword is used in determining the number of zeros and the number of ones in the word. The state of the flipflop FF11 thus constitutes a bookkeeping bit which indicates whether the subword S1 has been inverted. If so, the terminal K17 is high. Corresponding considerations apply as regards the circuits for the other subword, which have the terminals K22, 23, K32, 33 etc. as their input terminals.

The foregoing demonstrates that the information on the output of A4 corresponds to the value of the logic function L4.

The amplifiers A2 and A3 receive the same signal as A4 on one input. The reference voltages are present on the terminals K3 and K4. If the percentage of ones exceeds 56percent, the output of A2 becomes high. Similar to A4 and A5, the feedback is not shown. Analogously, A3 supplies a high signal, if the pecentage of ones is less than 44. The outputs of A2 and A3 are connected by an OR-gate 03. The output signal of this OR-gate, consequently, supplies the information of the discussed logic function L1. If $L1 = 1$, this acts as the said proceed signal; if $L1 = 0$, this acts as the said stop signal.

The outputs of A4 and A5 are combined by means of the inverters I1 and I2, the AND-gates E6 . . . 9 and the OR-gates 01 and 02. As a result, the following logic functions appear on the output terminals K7 and K8:

$K7\colon (L2\cdot L4+L\overline{2}\cdot L\overline{4})$ $K8\colon (L\overline{2}\cdot L4+L2\cdot L\overline{4})$.

FIG. 10 shows a portion of the deciding unit in which the group of subwords to be treated is chosen. The circuit comprises a clock CL, three AND-gates E10, 11, 12, three SR-flipflops, FF12, 13, 14, and the terminals P1 . . . 4, K7, K8, *r*, LB1, LB2, LC4. During one clock pulse cycle CL supplies pulses to P1, P2, P3, P4 in succession. The first clock pulse controls the treatment of the group A of subwords (S1, S2, S3, S4). The second clock pulse controls the B-group of subwords, i.e., B1 (subwords S3, S4), or B2 (subwords S5, S6). If terminal K7 is high (see FIG. 9), group B2 is treated, and the flipflop FF13 is set via the AND-gate E11. However, if terminal K8 is high, the group B1 is treated and the flipflop FF12 is set via a pulse across the AND-gate E10.

The third clock pulse controls the treatment of the C-group of subwords, i.e., the groups C1 (subword S2), C2 (subword S3), C3 (subword S6), or C4 (subword S7). If terminal LB1 is high (subgroup B1 has been treated), a choice is made between the subgroups C1 and C2. If terminal B2 is high (subgroup B2 has been treated), a choice is made between the subgroups C3 and C4. In the latter case the terminal K7 is high, like terminal LB2, and as a result the flipflop FF14 is set so that terminal LC4 becomes high.

FIG. 11 is a more detailed diagram of the eight flipflops FF11 . . . 81 of FIG. 9. Each flipflop consists of two cross-wire fed back logic NAND-gates. For the treatment of a word, a reset pulse is supplied on the terminals 14, 24 . . . 84, so that the outputs denoted by 1 become high. The following logic signals are present on the other inputs:

11 $P1\cdot L1\cdot(L2\cdot L31+L\overline{2}\cdot L\overline{31})$
21 $P1\cdot L1\cdot(L2\cdot L32+L\overline{2}\cdot L\overline{32}$
25 $P3\cdot LB1\cdot L1\cdot(L2\cdot L32\cdot L\overline{2}\cdot L\overline{32})\cdot(L\overline{2}\cdot L4+L2\cdot L\overline{4})$
33 $P3\cdot LB1\cdot L1\cdot(L2\cdot L33+L\overline{2}\cdot L\overline{33})\cdot(L2\cdot L4+L\overline{2}\cdot L\overline{4})$
31 $P1\cdot L1\cdot(L2\cdot L33+L\overline{2}\cdot L\overline{33})$
35 $P2\cdot L1\cdot(L2\cdot L33+L\overline{2}\cdot L\overline{33})\cdot(L\overline{2}\cdot L4+L2\cdot L\overline{4})$
41 $P1\cdot L1\cdot(L2\cdot L34+L\overline{2}\cdot L\overline{34})$
45 $P2\cdot L1\cdot(L2\cdot L34+L\overline{2}\cdot L\overline{34})\cdot(L\overline{2}\cdot L4+L2\cdot L\overline{4})$
51 $P2\cdot L1\cdot(L2\cdot L35+L\overline{2}\cdot L\overline{35})\cdot(L2\cdot L4+L\overline{2}\cdot L\overline{4})$
61 $P2\cdot L1\cdot(L2\cdot L36+L\overline{2}\cdot L\overline{36})\cdot(L2\cdot L4+L\overline{2}\cdot L\overline{4})$
71 $P3\cdot LB2\cdot L1\cdot(L2\cdot L37+L\overline{2}\cdot L\overline{37})\cdot(L2\cdot L4+L\overline{2}\cdot L\overline{4})$
81 $P4\cdot LC4\cdot L1\cdot(L2\cdot L38+L\overline{2}\cdot L\overline{38})\cdot(L2\cdot L4+L\overline{2}\cdot L\overline{4})$
65 $P3\cdot LB2\cdot L1\cdot(L2\cdot L36+L\overline{2}\cdot L\overline{36})\cdot(L\overline{2}\cdot L4+L2\cdot L\overline{4})$ A stroke above the logic unit indicates the inverted value. The logic combinations are realized by means of AND-gates and OR-gates as shown, for example, in FIG. 9 for the functions $(L2\cdot L4+L\overline{2}\cdot L\overline{4})$ and $(L2\cdot L\overline{4}+L\overline{2}\cdot L4)$ by means of the elements L1, L2, E6 . . . 9, 01, 02. The terminals K17 . . . 87 are high, if the relevant subword is to be written in an inverted form. Present on the terminals 12 . . . 83 is the output signal of a read-out amplifier, which reads out the value of the bookkeeping bits which are stored with the word, and which determines whether the associated subword is stored in an inverted form. While all other input terminals are high and the flipflops FF11 . . . 81 are in the reset state, the terminals 12 . . . 85 become low for a subword which is stored in an inverted form. As a result, the relevant flipflop is set, and the associated 0-output becomes high. After reading out, the relevant subword is applied to a user in an inverted form. At the end of the reading phase, the terminals 14 – – – 84 become temporarily low so that the flipflops, in as far as is necessary, are reset and the output terminals K17 . . . 87 become low again.

As already described, the write phase is controlled by the quadruple clock pulse series P1 . . . 4 from the clock CL (FIG. 10). The terminals 11, 21, 24, 31, 33, 35, 41, 44, 51, 61, 64, 71 and 81, consequently, are high except if the logic function applied thereto contains the clock pulse. Under the control of P1, consequently, those of the terminals 11, 21, 31 and 41 become low for which the deviation with respect to the standard percentage of zeros has the same direction for word and subword, provided that L1 is true, i.e., that the deviation for the word is too large in an absolute valve. If the improvement was insufficient, the terminals 51 and 61 become low under the same condition under the control of clock pulse P2. A second condition, however, which is also to be satisfied is of course $(L2\cdot L4+L\overline{2}\cdot L\overline{4}) = 1$, i.e. the signal on terminal K7 (FIG. 9) must be high. The third clock pulse can render the terminal 71 low in an analogous manner, and similarly the terminal 81 can be rendered low by the fourth clock pulse. The signal on the terminals LB2 (terminal 71) and LC4 (terminal 81) also cooperates in the described manner.

In the case of "overshoot," terminal K8 becomes high (FIG. 9), with the result that the terminals 35, 45, 65 can become low. Under the control of clock pulse P2, and provided that deviations with respect to the standard percentage have the same direction for the word and the subword, this applies to terminals 35 and 45 under the control of P3, and under the same condition, this applies to terminal 65 (in that case, terminal LB2 must also be high). Terminals 25 and 33 then remain. Terminal 25 becomes low under the control of clock pulse P3 and the information on terminal LB1, and for the remainder under the same condition as the terminals 35 and 45: the overshoot was insufficiently corrected.

Terminal 33 becomes low under the control of clock pulse P3, if overshoot occurred again upon treatment of the subwords S3 and S4, so that terminal K7 became high again.

After the clockpulse P4, it has been determined in each case which subwords have to be inverted, i.e. by the information on the terminals K17 . . . 87: a high signal means inversion. After writing-in, the terminals 14 . . . 84 temporarily become low again on account of a reset generator not shown, and the write phase is terminated.

Many modifications are possible within the scope of the invention. For example, the division into subwords can differ from that followed in the described device, which is given merely by way of example. It is also possible, for example, to terminate the comparison signal when L1 becomes zero, in that superfluous clock pulses, for example, P4, are skipped if P1 previously became zero.

The invention can also be used for a matrix store which comprises a different kind of storage element, for example, semiconductors.

What is claimed is:

1. A store consisting of elements which can have two stable states, identified as zero and one, said store comprising first means which can be energized for writing-in an amount of information which together constitutes a word, second means associated with said first means by which, in the case of simultaneous energizing with said first means, zeros can be written-in, but by which in the case of simultaneously changed energizing, ones can be written-in, and third means connected to said second means for controlling said second means in order to reduce the spread in a percentage of zeros in the word to be written-in, a zero-determining unit by which the percentages of zeros in at least one subword, forming part of the word, and in a remainder of the word can be determined, a deciding unit connected to said zero-determining unit for receiving signals supplied by said zero-determining unit, said deciding unit connected to said third means for actuating said third means with respect to the at least one subword and the remainder of the word treated by the zero-determining unit.

2. A store as claimed in claim 1, wherein the percentage of zeros in the subwords into which the word can be divided, and the percentage of zeros in the complete word can be determined by the zero-determining unit, said zero-determining unit containing a difference detector for determining the difference between the percentage of ones in the word and a standard percentage said difference detector generating a proceed signal in the case of too large a difference, said detector activating the zero-determining unit at least as regards one subsequent subword, wherein in the case of a subword which is to be written-in in an inverted form, the information of that subword can be supplied in an inverted form to the zero-determining unit, said difference detector generating a stop signal in the case of a sufficiently small difference.

3. A store as claimed in claim 2 wherein the zero-determining unit comprises a plurality of inputs so that the percentages of zeros of a plurality of subwords can be separately determined simultaneously.

4. Apparatus for writing words into a matrix store, said words consisting of a plurality of bits in either a one or a zero condition, said apparatus comprising input means for an electrical signal representative of said words, means coupled to said input means for determining the departure from a given reference value substantially equal to 50 percent of the number of zero conditions in a given word to be stored, means coupled to said determining means for dividing the bits of said word into a plurality of subword portions when the given word contains zero conditions outside of a given percentage range about the said given reference value, means coupled to said dividing means for examining said subword portions to determine the percentage of zero conditions in successive portions, means coupled to said examining means for inverting successive subword portions having zero conditions complimentary to the zero conditions of said given word thereby to produce a plurality of subwords having total zero conditions within said given percentage range, and means terminating the inversion of further subword portions when the resultant word attains zero conditions within said given range.

5. Apparatus for writing words into a matrix store, said words each consisting of a plurality of bits in either a one or a zero condition, said apparatus comprising, input means for an electrical signal representative of said words, means coupled to said input means for determining the departure from a given reference value substantially equal to 50 percent of the number of zero conditions in a given word to be stored, means coupled to said determining means for dividing the bits of said words into at least two subword portions when the said given word contains zero conditions outside of a given percentage range about said given reference value, means coupled to said dividing means for inverting one of said subword portions containing more zero conditions than one condition and for inverting successive zero predominant subword portions of the remainder portion of said given word thereby to produce a resultant word having zero conditions within said specified range.

6. Apparatus for writing words into a matrix store as claimed in claim 5, wherein said given range extends from 44 percent to 56 percent.

7. Apparatus for writing words into a matrix store as claimed in claim 5, wherein said inverting means comprises means for inverting a subword portion having zero conditions less than the one condition thereof when the percentage of zero conditions in the word modified by successive inversions becomes less than 44 percent.

* * * * *